US012183144B2

(12) United States Patent
Hewitt et al.

(10) Patent No.: US 12,183,144 B2
(45) Date of Patent: *Dec. 31, 2024

(54) SECURE EXIT LANE DOOR (71) Applicant: Overhead Door Corporation, Lewisville, TX (US)

(72) Inventors: David Paul Hewitt, Lewisville, TX (US); Jason L. Ryan, Corpus Christi, TX (US); Federico Romero, Corpus Christi, TX (US); James W. Palmer, Corpus Christi, TX (US)

(73) Assignee: Overhead Door Corporation, Lewisville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/700,154

(22) Filed: Mar. 21, 2022

(65) Prior Publication Data
US 2022/0215709 A1 Jul. 7, 2022

Related U.S. Application Data (63) Continuation of application No. 16/267,520, filed on Feb. 5, 2019, now Pat. No. 11,282,319.
(Continued)

(51) Int. Cl.
*E05G 5/02* (2006.01)
*E05F 15/42* (2015.01)
(Continued)

(52) U.S. Cl.
CPC ............... *G07C 9/38* (2020.01); *E05F 15/42* (2015.01); *E05F 15/73* (2015.01); *G01S 13/04* (2013.01);
(Continued)

(58) Field of Classification Search
CPC .... E05B 1/0069; E05B 47/0012; E05B 17/22; E05B 47/00; E05B 53/001;
(Continued)

(56) References Cited

U.S. PATENT DOCUMENTS 3,779,178 A 12/1973 Riseley, Jr.
4,475,308 A 10/1984 Heise
(Continued)

OTHER PUBLICATIONS

"FlipFlow Twin Interlock System Description" document published Oct. 2007.*
(Continued)

*Primary Examiner* — Dionne Pendleton
(74) *Attorney, Agent, or Firm* — Haynes and Boone, LLP (57) ABSTRACT A door system is provided. The door system includes: a corridor sized to allow humans to move through the corridor, the corridor defined, at least in part by side walls, the corridor having a first end and a second end; a first door located at the first end, the first door configured to provide selective access between the corridor and a space outside of the corridor; a second door located at the second end, the second door configured to provide selective access between the corridor and a space outside of the corridor; and sensors configured to determine a direction of movement within the corridor, the sensors operatively connected to at least one of the first and second doors to cause at least one of the first and second doors to move to a closed position if any of the sensors detect a movement further than a threshold amount in an undesired direction.

20 Claims, 7 Drawing Sheets

Related U.S. Application Data (60) Provisional application No. 62/627,026, filed on Feb. 6, 2018.

(51) Int. Cl.
  *E05F 15/73* (2015.01)
  *G01S 13/04* (2006.01)
  *G01S 17/58* (2006.01)
  *G07C 9/38* (2020.01)
  *G07C 9/00* (2020.01)

(52) U.S. Cl.
  CPC ......... *G01S 17/58* (2013.01); *E05F 2015/483* (2015.01); *E05F 2015/767* (2015.01); *E05G 5/02* (2013.01); *E05Y 2201/234* (2013.01); *E05Y 2800/426* (2013.01); *G07C 9/00896* (2013.01)

(58) Field of Classification Search
  CPC .... E05B 65/0035; E05B 65/0085; A61L 2/10; A61L 2/183; A61L 2/22; A61L 2/24; A61L 2202/14; A61L 2202/25; G07C 9/00; G07C 9/00571; G07C 9/00896; G07C 9/38; G07C 9/22; G07C 9/00182; G07C 9/15; G07C 2009/0096; G07C 2209/08; G07C 2209/62; G07C 2209/64; G07C 5/0808; G07C 5/0866; G07C 9/00174; G07C 9/00563; G07C 9/00904; G07C 9/00912; G07C 9/00944; G07C 9/257; G07C 9/28; G07C 9/32; G07C 9/27; G07C 9/25; G01S 13/04; G01S 17/58; G01S 13/89; G01S 15/04; G01S 15/87; E05Y 2201/234; E05Y 2800/426; E05Y 2400/44; E05Y 2400/822; E05Y 2900/132; E05Y 2400/54; E05Y 2400/82; E05Y 2400/10; E05Y 2400/3013; E05Y 2400/32; E05Y 2400/40; E05Y 2400/45; E05Y 2400/458; E05Y 2400/50; E05Y 2400/502; E05Y 2400/66; E05Y 2400/816; E05Y 2400/818; E05Y 2400/852; E05Y 2400/858; E05Y 2400/86; E05Y 2800/21; E05Y 2900/104; E05Y 2900/106; E05Y 2900/11; E05Y 2900/112; E05Y 2900/116; E05Y 2900/40; E05Y 2900/506; E05Y 2900/51; E05Y 2900/55; E05G 5/02; E05G 5/003; E05G 1/10; E05G 7/008; E05F 15/42; E05F 15/73; E05F 2015/483; E05F 2015/767; E05F 15/74; E05F 2015/765; E05F 15/77; E05F 15/00; E05F 15/43; E05F 15/60; E05F 15/72; E05F 15/79; E05F 15/41; E05F 15/608; E05F 15/70; E05F 2015/434; E05F 2015/435; E05F 15/40; E05F 15/643; E05F 15/655; E06B 2009/6836; E06B 9/68; E06B 3/48; E06B 5/01; E06B 5/10; E06B 5/106; E06B 11/085; E06B 2009/885; E06B 3/90; E06B 9/08; E06B 9/88; E06B 3/903; H04W 4/90; H03K 17/943; H03K 2217/94104; H01Q 15/0073; H01Q 3/46; G16H 40/67; G08G 1/015; G08G 1/04; G08G 1/042; G08G 1/056; G07B 15/04; G06T 2207/30156; G06T 2207/30248; G06T 2207/30252; G06T 7/001; G06T 2207/10016; G06T 2207/30232; G06T 7/248; G06T 2207/30241; G06T 7/20; G06T 7/231; G06T 7/70; G06T 7/97; G06Q 10/20; G01P 13/00; G01N 1/24; G01N 2001/022; G01N 2001/024; G01N 2001/2241; G01N 21/8806; G01N 27/622; G01N 33/48; G01N 33/4925; G01N 33/84; G01J 5/0025; G01J 5/10; F41H 13/0006; F41H 5/026; F41H 5/24; E04H 9/06; B66B 13/26; B61B 1/02; B61B 12/00; B61B 12/002; B61B 12/06; B01L 2200/143; B01L 2300/023; B01L 2300/0663; B01L 3/502715; A63G 27/00; A63B 2063/001; A63B 2209/00; A63B 2220/805; A63B 2220/806; A63B 2220/833; A63B 2225/54; A63B 2243/0025; A63B 47/02; A63B 69/002; A63B 69/40; A63B 69/406; A63B 71/022; A63B 71/0622; A61M 2230/201; A61M 35/10; A61M 37/0084; A61M 5/1723; A61H 2201/1207; A61H 2201/165; A61H 2201/1654; A61H 2201/5043; A61H 2201/5058; A61H 23/00; A61H 23/02; A61F 13/00055; A61F 13/42; A61F 2013/424; H04N 7/188; H04N 23/56; H04N 23/66; H04N 23/90; H04N 5/2628; H04N 5/77; H04N 5/772; H04N 7/181; G08B 13/08; G08B 15/007; G08B 25/12; G08B 13/1636; G08B 13/183; G08B 15/02; G08B 21/10; G08B 25/006; G08B 25/007; G08B 25/018; G08B 25/10; G08B 7/06; G08B 21/082; G06F 3/017; G06F 2203/04108; G06F 3/0304; G06F 3/0416; G06F 3/0421; G06F 3/0428; G06F 3/04883; G06F 18/22; G01V 8/10; G01V 8/20; G01V 3/08; A61B 5/14532; A61B 17/52; A61B 2503/04; A61B 2503/045; A61B 2560/0242; A61B 2562/0247; A61B 2562/0257; A61B 2562/029; A61B 5/0022; A61B 5/11; A61B 5/1117; A61B 5/145; A61B 5/14542; A61B 5/14546; A61B 5/15087; A61B 5/150961; A61B 5/389; A61B 5/4011; A61B 5/447; A61B 5/4845; A61B 5/6808; A61B 5/6829; A61B 5/742; A61B 5/7455; A61B 5/746; G06V 20/52; E05C 7/002; E05C 9/041; B64U 50/15; B64U 70/20; B64U 70/50; B64U 80/40; B64D 11/00; B64C 1/1407; B05B 1/16; B05B 12/122; Y10T 70/7073; Y10S 250/01; H04L 9/3231; H01B 7/228; F41F 1/08; F41F 3/04

See application file for complete search history.

(56) References Cited

U.S. PATENT DOCUMENTS

| | | | |
|---|---|---|---|
| 4,481,887 A * | 11/1984 | Urbano | E05G 5/02 109/6 |
| 4,530,183 A | 7/1985 | Heise | |
| 4,534,131 A | 8/1985 | Blackston | |
| 4,586,441 A | 5/1986 | Zekich | |
| 4,628,496 A | 12/1986 | Lee | |
| 4,741,275 A * | 5/1988 | Lewiner | E05C 7/002 109/7 |
| 4,785,580 A | 11/1988 | Oleson | |
| RE33,407 E | 10/1990 | Schwarz | |
| 5,097,454 A | 3/1992 | Schwarz | |
| 5,195,448 A * | 3/1993 | Sims | E05G 5/02 109/6 |

(56) References Cited

U.S. PATENT DOCUMENTS

| | | | |
|---|---|---|---|
| 5,201,906 A * | 4/1993 | Schwarz | G01S 15/87 |
| | | | 340/541 |
| 5,400,722 A * | 3/1995 | Moses | G07C 9/25 |
| | | | 109/9 |
| D359,833 S * | 6/1995 | Nevelle | D99/35 |
| 5,647,173 A | 7/1997 | Stark | |
| 5,694,867 A * | 12/1997 | Diaz-Lopez | E05G 5/003 |
| | | | 109/6 |
| 5,697,867 A | 12/1997 | Diaz-Lopez | |
| 5,769,011 A * | 6/1998 | Daniel | E05G 5/02 |
| | | | 109/7 |
| 5,878,529 A | 3/1999 | Huber | |
| 6,058,652 A | 5/2000 | Uhl | |
| 6,308,644 B1 * | 10/2001 | Diaz | E05G 5/003 |
| | | | 109/6 |
| 6,742,301 B1 | 6/2004 | Schwarz | |
| 7,583,196 B2 * | 9/2009 | Cohignac | G08B 21/082 |
| | | | 345/418 |
| 7,920,718 B2 * | 4/2011 | Marrion | G06V 20/52 |
| | | | 340/545.1 |
| 8,015,754 B2 | 9/2011 | Slagel | |
| 8,127,492 B1 | 3/2012 | Hellman | |
| 8,171,864 B2 * | 5/2012 | Mucio | E05G 5/003 |
| | | | 109/6 |
| 8,819,855 B2 | 8/2014 | Prasad | |
| 8,832,997 B2 | 9/2014 | Osann, Jr. | |
| 10,021,350 B2 | 7/2018 | Rayner | |
| 10,378,268 B2 * | 8/2019 | Portilla | B05B 12/122 |
| 11,053,729 B2 | 7/2021 | Romero et al. | |
| 11,282,319 B2 * | 3/2022 | Hewitt | G07C 9/00571 |
| 2002/0067259 A1 * | 6/2002 | Fufidio | G07C 9/28 |
| | | | 340/541 |
| 2003/0093951 A1 * | 5/2003 | Ikeuchi | E05F 15/74 |
| | | | 49/31 |
| 2005/0168574 A1 * | 8/2005 | Lipton | H04N 7/188 |
| | | | 348/143 |
| 2005/0200486 A1 * | 9/2005 | Greer | G16H 40/40 |
| | | | 340/573.1 |
| 2008/0028682 A1 | 2/2008 | Casella | |
| 2008/0110093 A1 | 5/2008 | Liles | |
| 2008/0244978 A1 | 10/2008 | Soyugenc | |
| 2009/0294704 A1 | 12/2009 | Zailer | |
| 2010/0011665 A1 | 1/2010 | Osann | |
| 2010/0157089 A1 * | 6/2010 | Pakulski | G06T 7/248 |
| | | | 348/222.1 |
| 2010/0253516 A1 | 10/2010 | Lemerand | |
| 2012/0090239 A1 | 4/2012 | Hondius | |
| 2013/0021136 A1 | 1/2013 | Brunetti | |
| 2013/0141233 A1 * | 6/2013 | Jacobs | G08B 21/043 |
| | | | 340/521 |
| 2013/0298466 A1 | 11/2013 | Osann | |
| 2015/0097651 A1 * | 4/2015 | Clough | G07C 9/00182 |
| | | | 340/5.7 |
| 2016/0148504 A1 | 5/2016 | Fitzgibbon | |
| 2019/0358397 A1 | 11/2019 | Staton | |
| 2020/0355014 A1 * | 11/2020 | Gregoriou | E06B 9/68 |
| 2021/0363811 A1 * | 11/2021 | Subramanian | E05B 65/0035 |

OTHER PUBLICATIONS

Youtube video—https://youtu.be/gxmBrp4bkcM?t=84—published Feb. 15, 2017.*

E-Security Portal Exit Lane Breach Control Demonstration (Passero Associates) Oct. 15, 2013 (Oct, 15, 2013) [online] <URL: https://www.youtube.com/watch?v_ACm13U4cwZk>0:00-2:43.

International Search Report and Written Opinion mailed May 10, 2019 in corresponding International Application No. PCT/US2019016672, 11 pages.

"FlipFlow Twin Interlock System Description" document published Oct. 2007 (Year: 2007).

Youtube video—https://youb.be/gmxBrp4bkcM?t=84—published Feb. 15, 2017 (Year: 2017).

Record USA, Product Data Sheet, record-USA FlipFlow airport exit lane breach control, Web page https://www.recorddoors.com/en/documents/DownloadDocument/2505 retrieved May 18, 2022, 5 pages.

* cited by examiner

SECURE EXIT LANE DOOR

RELATED APPLICATIONS

This application is a continuation of U.S. patent application Ser. No. 16/267,520, filed on Feb. 5, 2019, which claims the benefit of priority of provisional application No. 62/627,026 filed on Feb. 6, 2018, entitled "Secure Exit Lane Door," both of which are incorporated herein by reference in their entirety.

TECHNICAL FIELD

This patent disclosure relates generally to secure exit lane door system and, more particularly, to a door system normally permitting only one way traffic but the door system has other modes that may permit other directions of travel for some or all traffic.

BACKGROUND

Sometimes it is desired to ensure that people all move through a door in the same direction. Sometimes people need to be moved safely and securely from a secure area to an unsecure area. One example includes people disembarking from a flight need to exit a secured area of an airport to an unsecured area.

Typically security personnel are stationed at exit doors to reduce the likelihood that unauthorized persons will enter the secured area through the exit doors, or to report to other security personnel in the event that someone does, or attempts to, enter the secure area through the exit doors.

Stationing security personnel at exit doors can be expensive and manpower intensive. Further, security personnel are subject to human error and may allow a person or object to enter a secured area through an exit door. As a result, it may be desirable to augment or replace security personnel stationed at exit doors with a door system that can reliably reduce the likelihood of people or objects entering a secure area through exit doors, and in some embodiments, report if people or object do and/or attempt to enter a secure area through an exit door.

SUMMARY

The foregoing needs are met to a great extent by embodiments in accordance with the present disclosure, which may include a door system that can reliably reduce the likelihood of people or objects entering a secure area through exit doors, and in some embodiments, report if people attempt to enter and/or objects are attempted to be entered into a secure area through an exit door.

In some embodiments, a door system is provided. The door system includes: a corridor sized to allow humans to move through the corridor, the corridor defined, at least in part by side walls, the corridor having a first end and a second end; a first door located at the first end, the first door configured to provide selective access between the corridor and a space outside of the corridor; a second door located at the second end, the second door configured to provide selective access between the corridor and a space outside of the corridor; and sensors configured to determine a direction of movement within the corridor, the sensors operatively connected to at least one of the first and second doors to cause at least one of the first and second doors to move to a closed position if any of the sensors detect a movement further than a threshold amount in an undesired direction.

In some embodiments in another aspect, a method of providing a secure exit is provided. The method includes: locating a first door at a first end of a corridor; locating a second door at a second end of the corridor; detecting movement in the corridor and closing at least one of the first and second doors when the movement is in an undesired direction further than a threshold amount.

In yet another embodiment in another aspect, a door system is provided. The door system includes: a corridor sized to allow humans to move through the corridor, the corridor defined, at least in part by side walls, the corridor having a first end and a second end; a first door located at the first end, the first door configured to provide selective access between the corridor and a space outside of the corridor; a second door located at the second end, the second door configured to provide selective access between the corridor and a space outside of the corridor; sensors configured to determine a direction of movement within the corridor, the sensors operatively connected to at least one of the first and second doors to cause at least one of the first and second doors to move to a closed position if any of the sensors detect a movement further than a threshold amount in an undesired direction; a controller operatively connected to the sensors and the doors, the controller configured to received data from the sensors and send control signals to the doors; an extension of the side walls past the second door, the extension forming a corridor extension; and a sensor configured to detect motion in the corridor extension and send data to the controller.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION

The aspects of the disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings.

As shown in the FIGS., a door system 12 having a reliable breach system in place can allow people to leave a secure area 17 through an exit without allowing unauthorized people or objects to enter the sure area 17 from an unsecure area 19 through the exit. This allows security personnel to serve other areas of an operation rather than monitor the door system 12 or exit. Even in instances where security personnel are present, the door system 12 can augment and/or compliment the presence of the security personnel.

The door system 12 (also known as a secure exit lane 12 or corridor 12) has two ends 13, and 15. The secure exit lane or corridor 12 has an upper frame 14 and lower frame 16. Side panels 18 connect the upper fame 14 and lower frame 16. A first door, (which may include a single door or a pair of doors that work together to provide selective access to a first portal) is located at one end 13 or 15 and a second door (which may include a single door or a pair of doors that work together to provide selective access to a second portal) at the other end 13 or 15.

An entry header 20 and entry frame 22 help define a doorway and an entry door 24 is mounted to the entry frame 22. It will be understood that the terms "entry" and "exit" are arbitrary in that they refer to a direction through which traffic primarily moves through the doors 24 and 34. In some installations the exit lane 12 may installed or modified so that the "entry" door 24 is an exit and the "exit" door 34 may be an "entry." In addition, in some modes, as described later below, the primary direction of the flow of traffic may be reversed under certain conditions. As such, the terms "entry" and "exit" are descriptive and helpful but not limiting.

An exit header 30 and exit frame 32 help define a doorway and an exit door 34 is mounted to the exit frame 32. The first door 24 and second doors 34 are separated by the bulk of the secure exit lane 12 which may by several feet long. One example exit lane 12 or corridor 12 may be 20 feet long and 5 feet wide. Other examples may have lengths in the ranges of 8 to 40 feet of separation between the first 24 and second doors 34. Some door systems 12 may have a length of 20 feet (plus or minus 6 feet) that separates the first and second doors 24 and 34. Other examples may have greater or less separation then described above and the exit lane or corridor 12 may be wider or more narrow than 5 feet.

Figure 1:
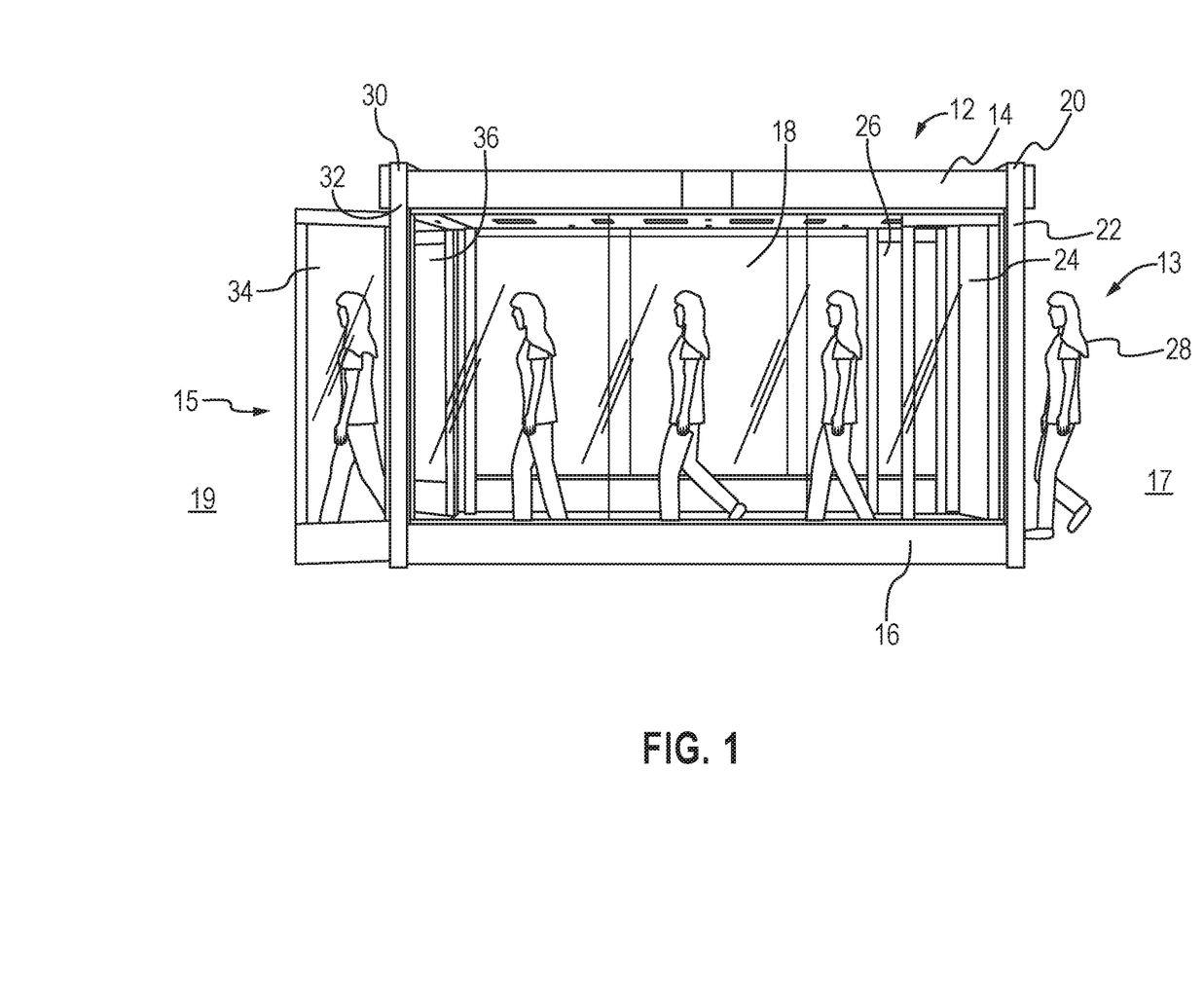
FIG. 1 is a side view of a secure exit lane in accordance with the present disclosure.
Figure 2:
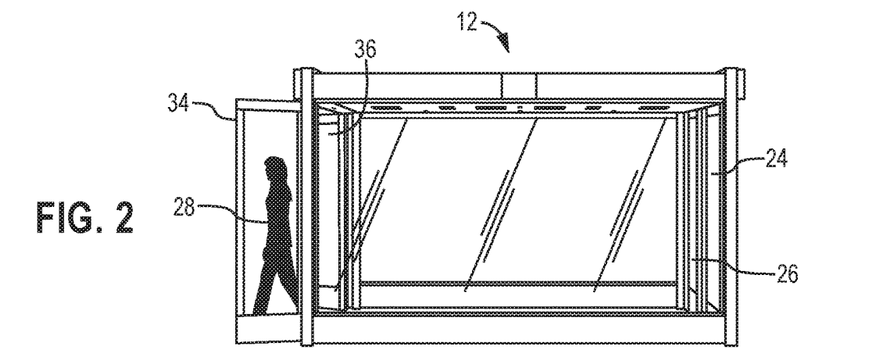
FIG. 2 is a side view of a secure exit lane showing a person leaving the secure exit lane in accordance with the present disclosure.
Figure 3:
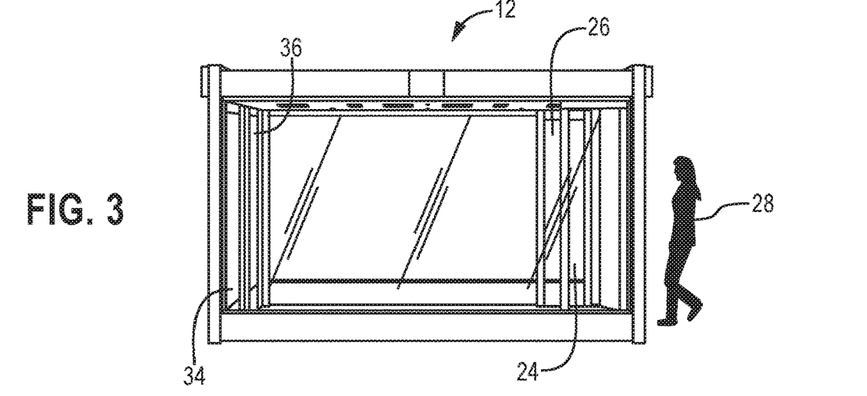
FIG. 3 is a side view of a secure exit lane showing a person entering the secure exit lane in accordance with the present disclosure.
Figure 4:
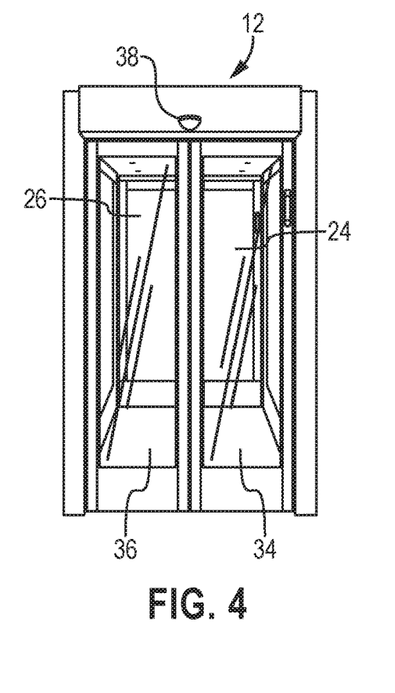
FIG. 4 is an end view of a secure exit lane with the doors closed in accordance with the present disclosure.
Figure 5:
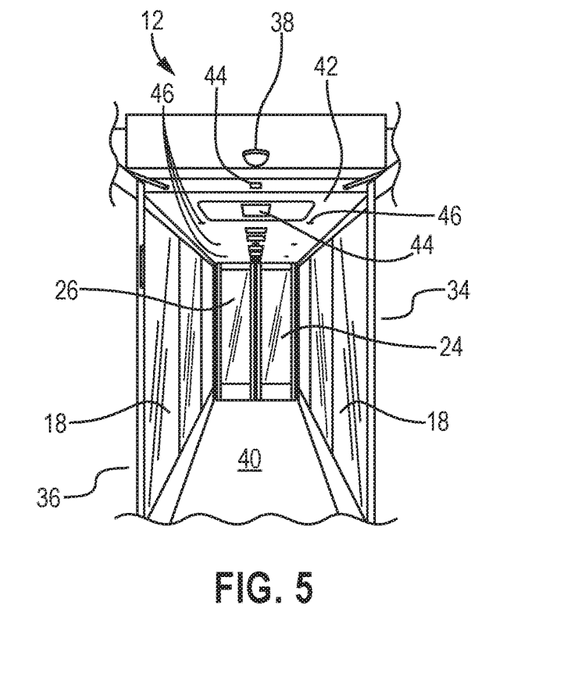
FIG. 5 is an end view of a secure exit lane with the doors opened in accordance with the present disclosure.

FIGS. 2-5 are various views of secure exit lanes. FIGS. 2 and 3 are side views. FIG. 2 shows a person 28 exiting the secure exit lane 12. FIG. 3 shows a person entering the secure exit lane 12. FIGS. 4 and 5 are end views. In FIG. 4 doors 34 and 36 are shut. In FIG. 5 doors 34 and 36 are open. In FIGS. 2-5, the a first set of doors 24 and 26 can be seen and a second set of doors 34 and 36 can be seen. FIGS. 4 and 5 show a sensor 38 mounted to the secure exit lane 12 that is configured to detect movement of a person or object approaching exit doors 34 and 36.

FIG. 5 shows the interior 40 of the corridor or exit lane 12. The corridor 12 is formed in part by the side panels 18. The corridor 12 includes a ceiling 42 with additional sensors 44 and lights 46 mounted in or on the ceiling 42.

Figure 6:
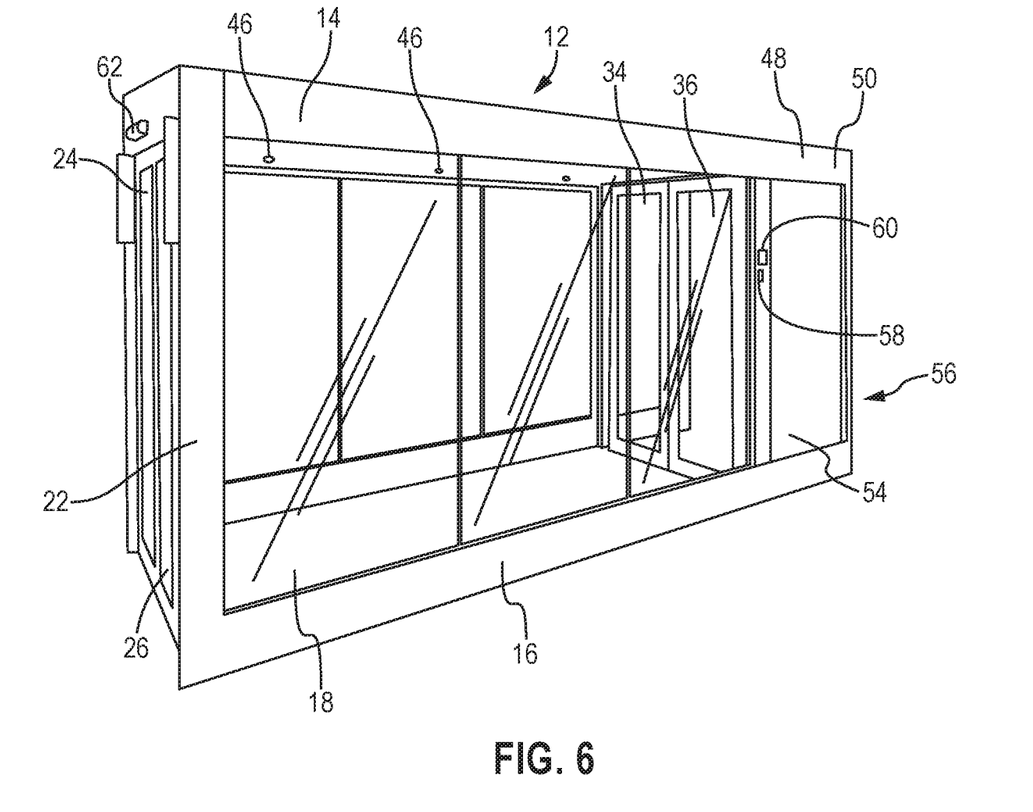
FIG. 6 is a perspective view of a secure exit lane with an exit extension in accordance with the present disclosure.

FIG. 6 is a perspective view of a secure exit lane 12 in accordance with another embodiment. The secure exit lane 12 shown in FIG. 6 includes an exit extension 48 located in the secure exit lane 12. The extension 48 includes an extension frame 50 attached to the frames 14 and 16 of the secure exit lane 12 and an extension frame header 52 (shown in FIG. 8). The extension frame 50 has an open end 56. The extension 48 is aligned with the corridor 12. The panels 54 are aligned with the panels 18 on the corridor 12. The sensors 44 and lights 46 can be seen. The sensor 62 is located above the doors 24 and 26 and entry frame 22. A key actuated lock 58 and user interface 60 are shown attached to the secure exit lane 12.

The key actuated lock 58 may be used to lock or unlock the user interface 60. In some embodiments the key actuated lock 58 and/or user interface 60 may be used to unlock the secure exit lane 12, turn off an alarm associated with the secure exit lane 12 or otherwise control the secure exit lane 12.

Figure 7:
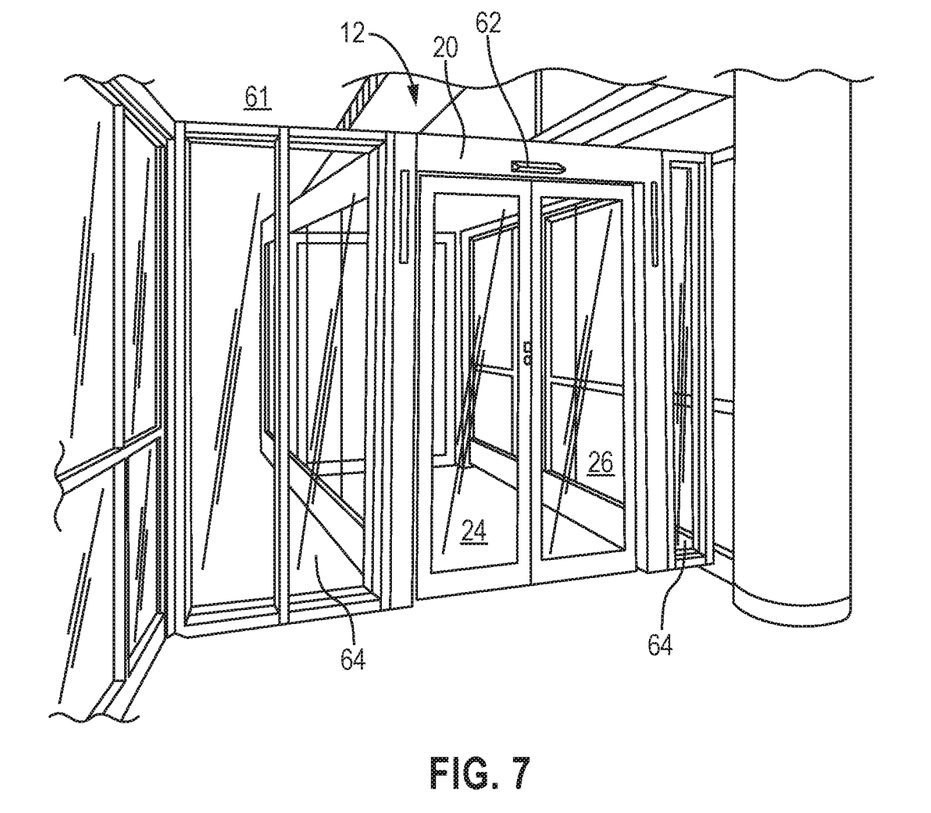
FIG. 7 is a perspective view of a secure exit lane installed in a building.

FIG. 7 shows a secure exit lane 12 installed in a building 61. An entry sensor 62 is located over the doors 24 and 26 to sense movement in the area near the entrance of the secure exit lane 12. Guiding panels 64 channel traffic toward the doors 24 and 26.

Figure 8:
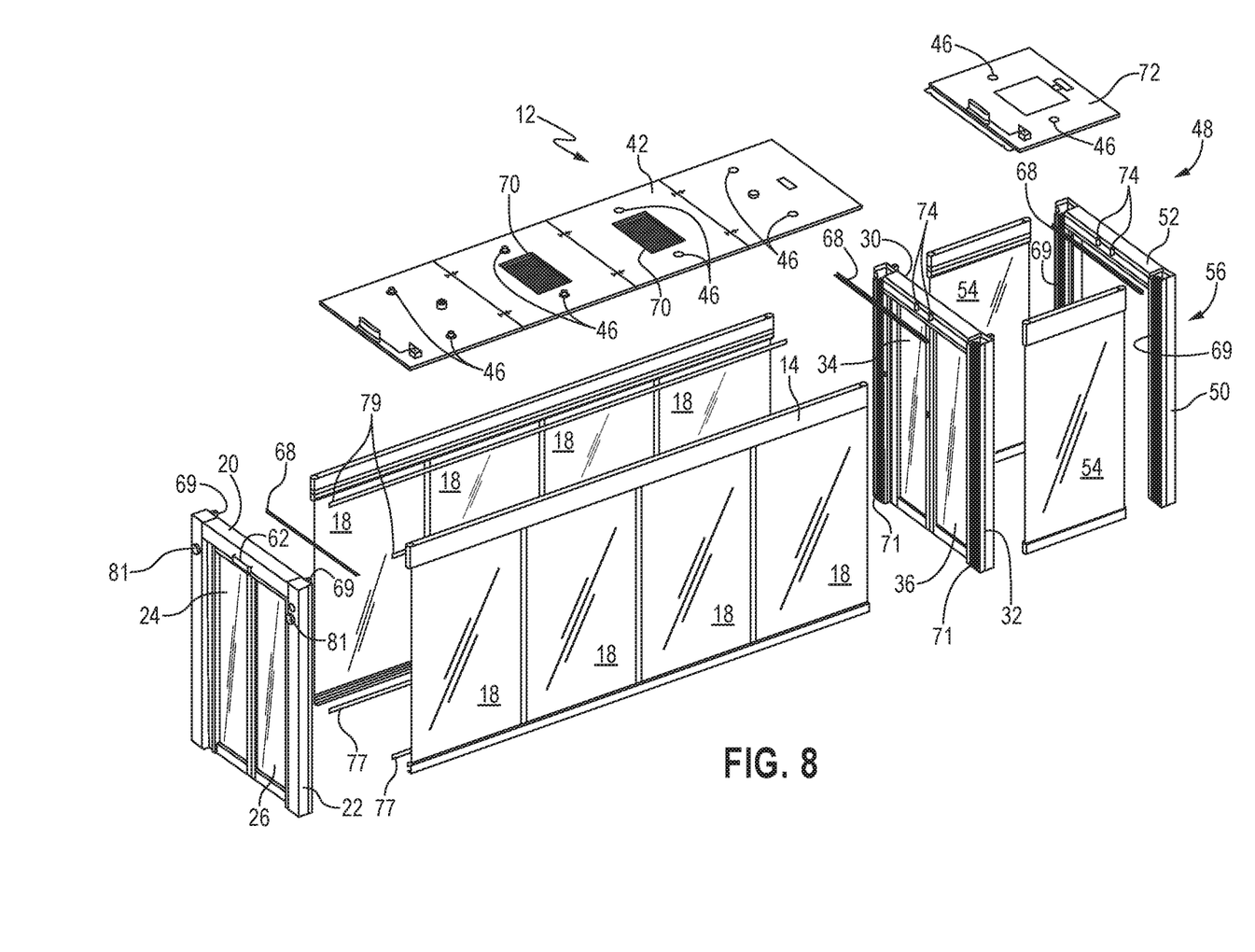
FIG. 8 is an exploded view of a secure exit lane in accordance with present disclosure.
Figure 9:
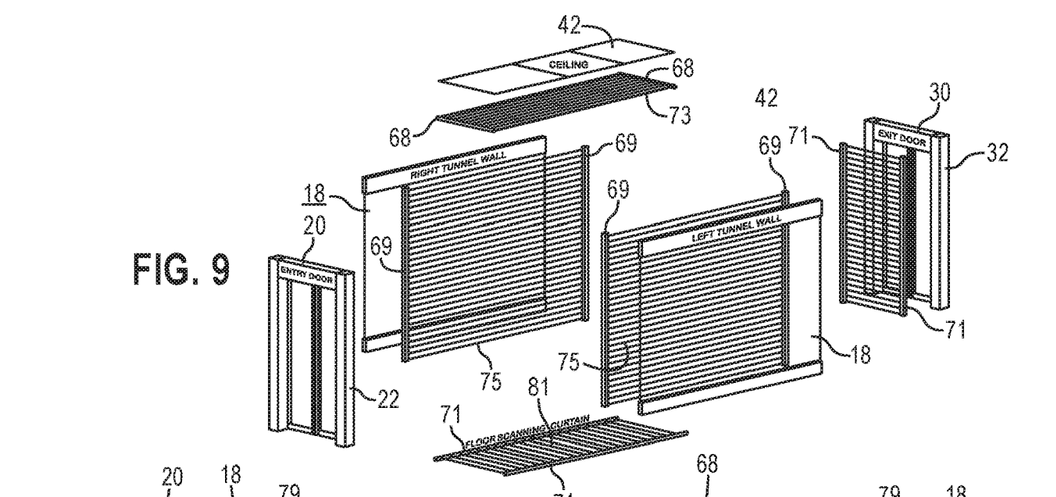
FIG. 9 is a schematic diagram of a controller for the secure exit lane in accordance with the present disclosure.

FIG. 8 is an exploded view of the secure exit lane shown in FIG. 6. The entry frame 22 is shown with the entry header 20 and doors 24 and 26. The entry sensor 62 is located on the entry header 20. The ceiling 42 for the corridor 12 is shown with lights 46 and vents 70. As shown in both FIGS. 8 and 9, ceiling curtain sensors 68 are mounted to the entry and exit headers 20 and 30. These sense an area near the ceiling 42 as illustrated by parallel lines 73 as shown in FIG. 9. FIGS. 8 and 9 show the wall sensors 69 which may be mounted to either the entry or exit frames 22 or 32. The wall sensors 69 detect areas near the panels 18 as illustrated by parallel lines 75 in FIG. 9. Floor scanning sensors 77 may scan an area near the floor as shown by parallel lines 81 in FIG. 9. Door sensors 71 may be located near the doors 34, 36. Similar door sensors may be placed near other doors for sensing movement of those doors or movement near those doors. Sensors 79 may also scan and monitor movement within the exit lane 12.

In the exit extension 48, sensors 68 may scan and sense an area near the extension ceiling 72 similar to the sensors 68 between the doors 24, 26, and 34, 36. There may also be floor sensors sensing areas near the floor, door sensors, and door sensors near the side panels 54 and the doors 32, 34 or opening 56 similar to the sensors in the areas between the doors 24, 26 and 34, 36. Other sensors 74 mounted to the exit door header 30 and extension header 52 may be configured to detect people or objects moving into the area between doors 24, 26 and 34, 36 or into the extension area. Sensors 69 may be attached to the extension frame 50 and/or exit frame 32 to scan and detect areas near the extension panels 54.

Figure 10:
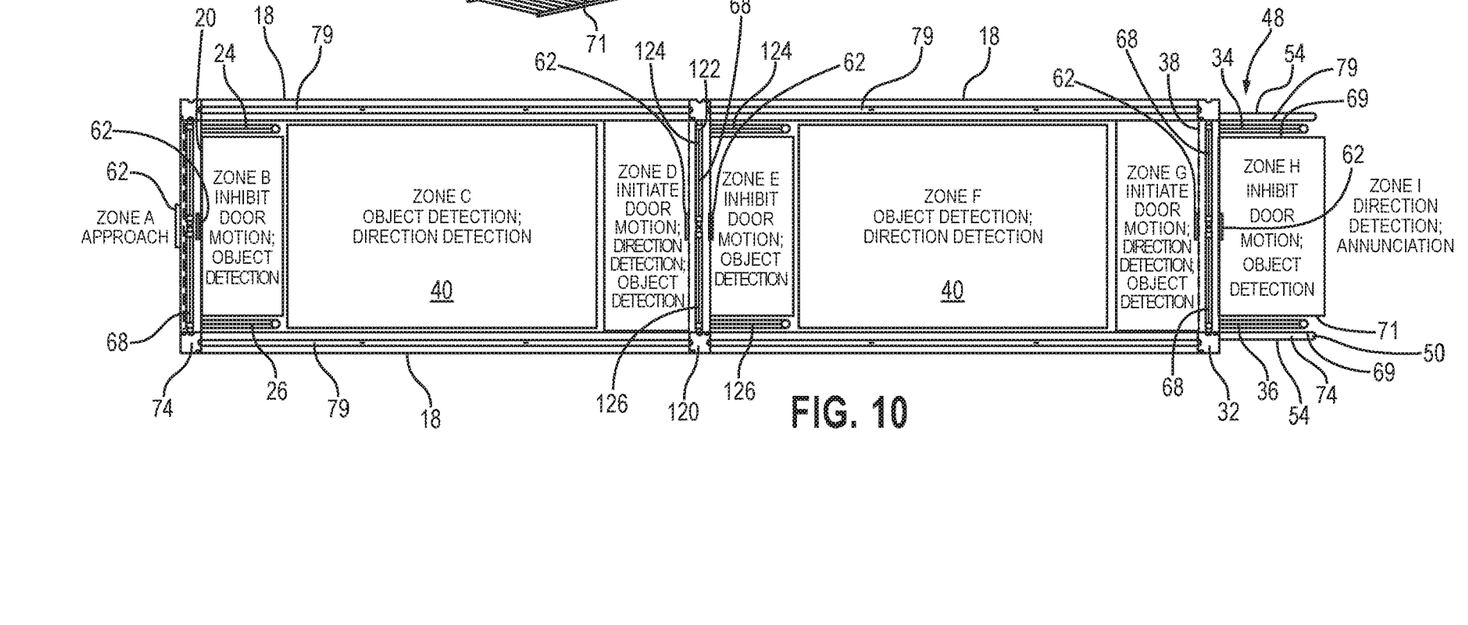
FIG. 10 is a top view of the secure exit lane in accordance with the present disclosure.

FIG. 10 is a top view showing an embodiment of the door system 12 having three sets of doors 24, 26, 34, 36, and 124, 126. For illustrative purposes, the doors 24, 26, 34, 36, and 124, 126 are shown in both the open and closed positions. A first set of doors 24, 26 are at one end, a second set of doors 34, 36 are at the other end and a third set of doors 124, 126, are in the middle of the secure exit lane 12. The infrared light curtains 68, 79 are shown which provide object/direction detection. The infrared light curtains 68 (also 71 shown in FIGS. 8 and 9) and 79 may be off the shelf items that are commercially available. The infrared light curtains 68 (also 71 shown in FIGS. 8 and 9) and 71 or 79 are operatively connected to a door controller 76 (shown in FIG. 11 and described in more detail further below) to allow the door controller 76 to determine whether to open or close the doors and/or active an alarm system or mode based on input from the infrared curtains. In embodiments having only two doors rather than three, Zone A is moved to where Zone D is shown and Zones B, C, and D and their corresponding structure are absent. Alternatively, Zones D and E are omitted with their corresponding exit lane 12 structure and Zones C and F are merged. The zones show what areas the various sensors, and/or sensor curtains monitor and detect.

The sensors 62 may be mounted to the entry header 20 and monitor the Zone A (the approach) to the secure exit lane 12 and Zone B which includes motion of the doors 24 and 26. Additional sensors 68, 69 and 71, (as shown in FIG. 9) 74, 79, and other sensors may monitor the floor, ceiling 42, along the side panels 18. Sensors 62 may be mounted to the mid door header 122 and/or mid door frame 120 and sense Zones D and E as well as the movement of the mid doors 124 and 126. Additional sensors 68, 69 and 71, (as shown in FIG. 9) 74, 79, may monitor the floor, ceiling 42, along the side panels 18 for Zones D, E, F, and G. Sensors 62 or other sensors may be mounted to the exit door header 30 and/or exit door frame 32 and sense Zones G and H as well as the movement of the doors 34 and 36. Additional sensors 68, 69 and 71, (as shown in FIG. 9) 74, 79, may monitor the floor, ceiling 42, along the side panels 54 for Zones H and I.

A purpose of the extension 48 extending beyond the exit doors 34, 36 as shown in FIGS. 6, 8, and 10 is that if someone (or an object) is going the wrong way to attempt to enter the secure exit lane 12 the person or object will be detected by sensors prior to entering through the exit doors 34 and 36. During an initial movement toward the interior 40 of the exit lane 12, warning lights and/or an audible alarm may activate to provide a warning to not enter the exit lane 12 and/or extension the 50 from the exit end. The alarm may include sirens, verbal instructions, and/or other audible and visional warnings. If continued movement into or toward the interior 40 of the exit lane is detected, the exit lane 12 may shut and lock the doors 34, 36 (or all of the doors 24, 26, and 124, 126) sound an alarm, active a camera to document the incident, and notify security personnel. In some embodiments, various threshold amounts of movement may be set to trigger the different actions taken by the secure exit lane 12. These threshold amounts may be factory set or modified on site.

Figure 11:
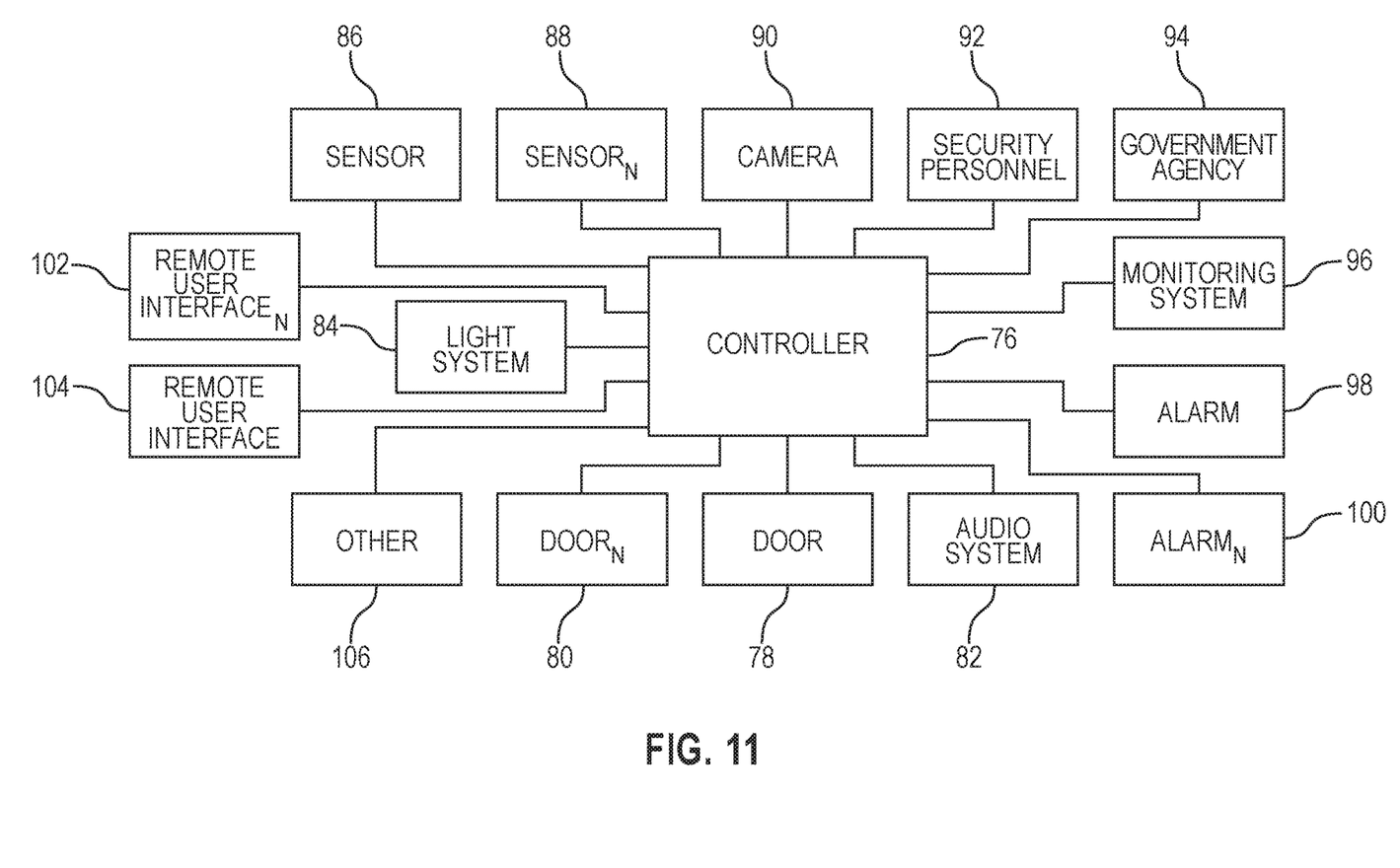
FIG. 11 is a schematic diagram of a controller for the secure exit lane in accordance with the present disclosure.

FIG. 11 is a schematic diagram of a controller 76 for the secure exit lane 12. The controller 12 may be a microcontroller and receive inputs, process those inputs, and generate outputs. The controller 76 may receive inputs from various sensors 86, 88 (88 represents any number of sensors represented by the subscript "n"). The sensors 86, 88 may include (but are not limited to) any of the above described sensors such as 38, 44, 62, 68, 69, 71, 74, 77, and 79.

In some embodiments, some, all or none of the sensors 86, 88 (such as 38, 44, 62, 68, 69, 71, 74, 77, and 79) may be infra-red sensors. Infra-red sensors may have advantages in that infra-red sensors may work in low light conditions and very high or dazzling conditions. For example, several lights may shine near the sensors 86 88 and there may be reflections due do the reflexive surfaces associated with the exit lane 12. Some light-based sensors may lose effectiveness due to dazzling light conditions. Infra-red sensors may not have such limitations. Further, in some embodiments, at least some of the sensors 86 88 may have the capability to count people and/or objects. As such, the sensors 86 88 may count X many people and/or objects moving in a certain directions and Y amount of people and/or objects moving in the opposite direction. The counting data may be provided to the controller 76. The controller 76 may be configured to react if one person or object moves in a particular direction.

The controller 76 may receive data input from a camera 90, and various remote user interfaces 102, 104. The camera(s) 90 may be always on, on when the door system 12 is active, or only turn on when activated by the controller 76 when various movement thresholds are exceeded or turned on by some other triggering event. The user interfaces 102 or 104 may be the key lock 58 and/or the key pad 60 shown in FIG. 6 or they could be computers, tablet computers, cell phones, or other devices that are configured to communicate with the controller 76.

The controller 76 may send output signals to control features of the secure exit lane 12, provide data to external devices, to request security assistance, to provide instructions to users of the secure exit lane 12 or for any other purpose. For example, the controller 76 may communicate with security personnel 92 if the data provided to the controller 76 indicates a person or object is moving the "wrong" way through the exit lane 12. In addition, if other faults or conditions are detected, the controller 76 may contact security personnel 92. The security personnel 92 may include local law enforcement, private security, Federal law enforcement, or any other security personnel. The controller 76 may also send data to a government agency 94 such as the Transportation Security Administration (TSA), or the like or other remote monitoring system 96. The data may include data the sensors 86, 88, and/or data from the camera(s) 90 input to the controller 76. The data may also include operational data regarding the secure exit lane 12.

The controller 12 sends control signals to the door 78 80 (the door 80 represents any number of doors represented by the subscript "n"). The doors represented by blocks 78, 80 in FIG. 11 may include doors 24, 26, 34, 36, 124, and 126 shown in the FIGS or other doors. In some embodiments, the controller 76 may send control signals to an audio system 82 and/or a light system 84. The audio system 82 and the light system 84 (see reference number 81 in FIG. 8) may be operated together or separately to provide warnings or instructions to persons attempting to approach, enter, or move through or have objects enter, approach, or move through the secure exit lane 12 in the wrong direction.

In some embodiments, if the sensors 86 88 detect persons or objects approaching, entering or moving through the exit lane the wrong way, the controller 76 has a threshold amount where the controller 76 takes no action. This may avoid action for unimportant or trivial movements. If the detected movement exceeds the threshold amount, the controller 76 may active the audio system 82 and/or light system 84 to warn or direct people near the secure exit lane 12 to stop moving (or moving an object) toward (or toward an interior of the) the exit lane 12 or the wrong way through the exit lane 12. This may be particularly used to warn people to not move or move objects from a non-sure area 19 toward a secured area 17 via the exit lane 12.

If the detected movement through exit lane exceeds another threshold amount after the audio 82 and/or light 84 systems have been activated an alarm system 98 and/or alarm systems 100 may be activated by the controller 76. One alarm system 98 may be located on or proximate to the secure exit lane 12. This alarm system 98 may warn people that the doors 78 and 80 are shutting and locking. (Which may be done by control signals to the doors 78 and 80 from the controller 76). A second alarm system 100 may be remotely located and warn security personnel 92, governments agencies 94 and/or a monitoring system 96 that movement by one or more persons or objects have moved or attempted to move in an undesirable direction toward, into, or through the secure exit lane 12 (and in some embodiments, including the extension portion 48).

A door system 12 can be modified to best fit a desired security level or mode of operation. For example, different levels or modes may include: interlock, lockdown, all open, cleaning/service, and free flow mode.

In certain applications, it may be desirable to have different levels of security for the secure exit door 12. For example, in case of emergency or fire, it may be desirable to allow the secure exit lane 12 to open its doors 78 80 to allow the free passage of first responders and/or allow for the evacuation of people. Other times such as cleaning or performing maintenance on the secure exit lane 12 it may be desirable to allow the secure exit lane 12 to operate in a modified way. Further, various installations may have different security requirements so it may be desirable to allow the secure exit lane 12 to operate in various way to accommodate various local conditions. As such, the secure exit lane 12 and operate in various modes. Each mode may be useful for various operation conditions. The following is a description the various modes the controller 76 may be set to operate the secure exit lane 12 in a desired way to accommodate local conditions. In some embodiments the controller 76 may be set to the various modes via remote a user interface 102, or 104.

When a security need is moderately low, the door system 12 may be configured to operate in a free flow mode. In the free flow mode, all of the doors 78, 80 may stay open to allow foot traffic to flow in a single direction. Sensors 86, 88 associated with the door system 12 may detect if a person tries to move in the opposite direction of flow (the "wrong" direction) and send a signal to a door controller 76. The controller 76 may close a first door or set of doors 78 or 80 (for example the exit doors 34 and 36 and/or entry doors 24 and 26) to deny access to the person moving the wrong way to the secure area. In other embodiments, the door system 12 may close the second door (or set of doors) or both first and second (sets of) doors 78, 80 when a person and/or object is detected moving the wrong way. In some embodiments, the door system may allow a person to move a small distance in the wrong direction (for example a step or two) before closing the first and/or second (or sets of) doors 78, 80.

As mentioned above, if a person is detected moving the wrong way, an alarm system 98, 100 may be activated or the door system 12 may enter an alarm mode. The alarm mode, the secure exit door (aka the door system) 12 may sound an audible signal, give voice commands to tell people to move in the correct direction, active a lights system 84, activate a camera(s) 90 and/or alert security personnel 92. The door system 12 may also detect if objects (such a contraband, luggage, bags, or other items) moves the wrong way through the door system 12. If objects are detected as moving the wrong way or are stationary for too long a time or are unattended, the first, second and/or both doors (or sets of doors) 78, 80 may be shut and/or the alarm system 98, 100 activated or the door system may enter an alarm mode.

The door system 12 is adapted to permit an authorized official to reset the door alarm(s) 98 100 and allow the doors 78 80 to reopen. This may require an authorized official to turn a key such as the key operated user interface 58, operate a user interface 60, or remotely reset the door system 12 with a remote user interface 102 or 104.

If it is desired to operate the door system 12 in a higher security mode, the door system 12 may be set to operate in an interlock mode. The modes may be selected by an authorized official by turning a key to a specific position, entering a command, code, or a sequence in the key operated user interface 58, via a user interface 60, or remotely setting the door system 12 to a desired mode with a remote user interface 102, 104.

In the interlock mode, the door system 12 and controller 76 may be more strict in its operation. Allowance thresholds may be smaller or reduced to zero. For example, the door system 12 may allow a person to move a shorter distance the wrong way (or not at all) than in the free flow mode before shutting the first and/or second doors 78, 80 and triggering the alarm 89, 100 or entering an alarm mode. In the interlock mode, not all of the doors 78, 80 or sets of doors 78, 80 may be open at the same time. In the interlock mode, the first door (or set of doors) 78 may open while at least one other door or set of doors 80 is shut. For example, exit doors 34, 36 may be closed, but entry doors 24, 26 may be opened to allow people to enter the secure exit lane 12. Then the entry door(s) 24, 26 will shut and the exit door(s) 34, 36 will open to allow people to exit the secure exit lane 12. In optional embodiments, once it is detected that everyone (and/or everything) has exited the secure exit lane 12, the exit door(s) 34, 36 will close. The process may then be repeated with the entry door(s) 24, 26 again opening.

The door system 12 may also be set to a lockdown mode. In the lock down mode, both the entry door(s) 24, 26 and exit door(s) 34, 36 (and other sets of doors 124, 126 if equipped) are closed and/or locked to prevent anyone (and/or anything) from leaving the area. The door system 12 may stay in a lock down mode with both the first and second doors locked until operated by an authorized user using any of the remote user interfaces 58, 60, 102, 104 as discussed above.

The door system 12 may also be set to an all open mode. In the all open mode, all doors 78, 80 are moved to the open position. The detection sensors may be disabled to allow the doors 78, 80 to stay open and the alarm(s) 98, 100 may not be triggered. In other embodiments, the alarm(s) 98 100 may be triggered and a notification sent to entities 92, 94, 96 monitoring the door status when the door system 12 is placed in all open mode. This allows rapid evacuation of the secure area during emergencies such as a fire and allows entry to the secure area for first responders or others who may need access.

The door system 12 may have a cleaning/maintenance mode. In the cleaning mode, one door (or set of doors) 78, 80 is open, while the other door (or set of doors 78, 80) is shut to allow cleaning and/or maintenance personnel to service the door system 12 without allowing access to the secure area 17.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure.

We claim:

1. A method of providing a secure exit from a secure area to an unsecure area, comprising:
   detecting presence of a stationary first object inside a corridor with at least one curtain sensor disposed in the corridor; and
   closing at least one of a first door at a first end of the corridor adjacent the unsecure area or a second door at a second end of the corridor adjacent the secure area in response to the presence being detected for a period of time exceeding a threshold amount.

2. The method of claim 1, further comprising:
   detecting, with a sensor disposed outside the corridor, a second object approaching the corridor; and
   closing at least one of the first and second doors in response to detecting the second object approaching the corridor, wherein the second object is the first object or is a different object than the first object.

3. The method of claim 1, further comprising:
   detecting, with a sensor disposed outside the corridor, presence of a second object in an extension aligned with the corridor and extending from the second door in a direction away from the first door; and
   closing at least one of the first and second doors in response to the presence of the second object being detected for a period of time exceeding the threshold amount, wherein the second object is the first object or is a different object than the first object.

4. The method of claim 1, further comprising activating an alarm system in response to the period of time exceeding the threshold amount.

5. The method of claim 1, further comprising:
   receiving data from at least one second sensor indicating detection of the presence of the first object in the corridor; and
   commanding movement of at least one of the first and second doors based on the received data.

6. The method of claim 5, further comprising transmitting door status data to a receiver remote from the corridor.

7. The method of claim 1, wherein the first object is contraband, luggage, or a bag.

8. A method of providing a secure exit from a secure area to an unsecure area, comprising:
   detecting movement of an object inside a corridor with at least one curtain sensor disposed in the corridor; and
   closing at least one of a first door at a first end of the corridor adjacent the unsecure area or a second door at a second end of the corridor adjacent the secure area in response to the movement exceeding a threshold amount.

9. The method of claim 8, wherein the threshold amount comprises a distance.

10. The method of claim 8, wherein the threshold amount comprises a direction of movement.

11. A door system comprising:
    a corridor sized to allow humans to move through the corridor, the corridor defined, at least in part by side walls, the corridor having a first end and a second end;
    a first door located at the first end, the first door configured to provide selective access between the corridor and a first space outside of the corridor;
    a second door located at the second end, the second door configured to provide selective access between the corridor and a second space outside of the corridor;
    a first curtain sensor disposed within the corridor and oriented with a detection plane extending laterally across the corridor; and
    a controller operatively connected to the first curtain sensor and the first and second doors, the controller configured to receive data from the first curtain sensor and to send a control signal to at least one of the first or second doors in response to the received data from the first curtain sensor, the control signal instructing the at least one of the first or second doors to move between an open position and a closed position.

12. The door system of claim 11, wherein the controller is configured to send the control signal in response to the received data indicating an object has been detected in the corridor for a period of time exceeding a threshold amount.

13. The door system of claim 12, wherein the object is contraband, luggage, or a bag.

14. The door system of claim 11, further comprising:
    a corridor extension defined by the side walls extending past the second door in a direction away from the first door; and
    a sensor configured to detect presence of a second object in the corridor extension.

15. The door system of claim 11, further comprising a second curtain sensor disposed within the corridor, the second curtain sensor being operatively connected to the controller, the controller configured to receive data from the second curtain sensor and to determine a direction of movement of an object based on the data received from the first and second curtain sensors.

16. The door system of claim 15, further comprising an alarm system operatively connected to the controller, wherein the controller is configured to activate the alarm system in response to the data received from the first and second curtain sensors.

17. The door system of claim 15, wherein the controller is configured to execute a first action in response to the data received from the first and second curtain sensors indicating the movement of the object has exceeded a first threshold amount in an undesired direction and to execute a second action in response to the data received from the first and second curtain sensors indicating the movement of the object has exceeded a second threshold amount in the undesired direction.

18. The door system of claim 17, wherein the first action is activation of an alert and the second action is the sending of the control signal to the at least one of the first or second doors.

19. The door system of claim 17, wherein the first action is the sending of the control signal to the first door and the second action is sending a second control signal to the second door.

20. The door system of claim 11, further comprising a plurality of second sensors disposed within the corridor and operatively connected to the controller, wherein the controller is configured to send the control signal in response to data received from the plurality of second sensors indicating that an object in the corridor is unattended.

* * * * *